Figure 1:
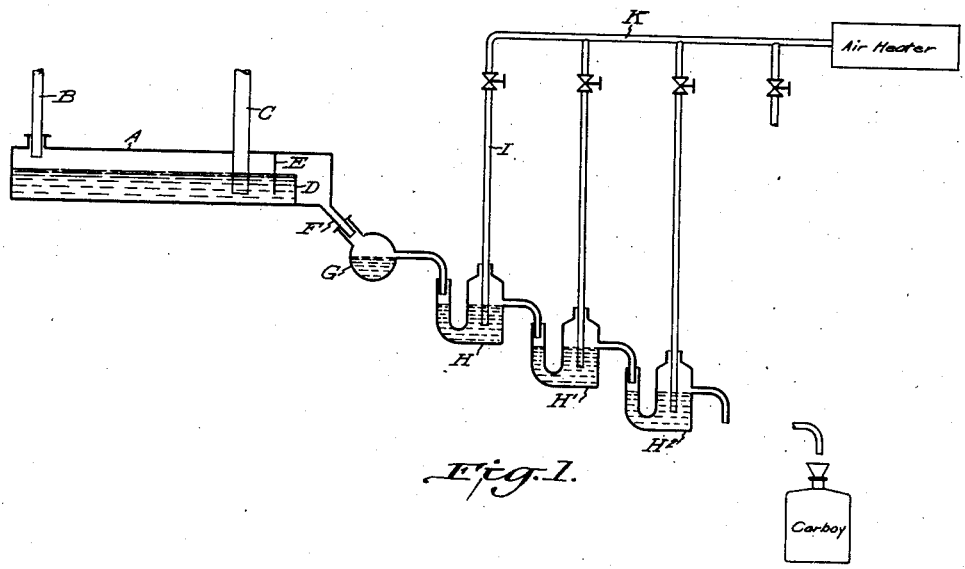

June 17, 1930.                 H. HOWARD                 1,764,309
      PROCESS FOR THE MANUFACTURE OF SULPHURIC ACID OF HIGH PURITY
                          Filed April 22, 1927

Inventor:
Henry Howard
By Byrnes Townsend & Buckenstein
his Attorneys

Patented June 17, 1930

1,764,309

UNITED STATES PATENT OFFICE

HENRY HOWARD, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE

PROCESS FOR THE MANUFACTURE OF SULPHURIC ACID OF HIGH PURITY

Application filed April 22, 1927. Serial No. 185,850.

In 1905 a process for the manufacture of sulphuric acid of high purity had been developed and was in commercial use by the Tentelevski Chemical Works and some of the licensees of their contact process in Europe and in 1908 in this country. By this process $SO_3$ was obtained by heating oleum to about 260° C. which drove off the $SO_3$; this $SO_3$ was condensed at such a temperature as to produce liquid $SO_3$. This product was then further purified by distilling it in a still heated by low pressure steam (about atmospheric pressure) which, of course, gave $SO_3$ vapors entirely free from $H_2SO_4$ or other nonvolatile impurities. This $SO_3$ was then contacted with pure distilled water in a condenser made of some inert material, such as platinum, the water being fed in a continuous manner in quantity sufficient to give sulphuric acid of the desired strength; this was run directly into the shipping containers, usually glass carboys.

The acid so obtained is substantially chemically pure with the exception of a small amount of $SO_2$, which remains dissolved in the acid. This was usually eliminated by blowing purified air through the acid contained in the carboys. But this proposition was not entirely satisfactory. If the acid is cold, it will require a considerable amount of air and time to free it from the dissolved sulphur dioxide. If the acid is run hot into the carboys and blown when still hot, there will be danger of breakage with all the serious inconveniences entailed thereby. Another disadvantage of this process is that the amount of the $SO_3$ vapors given off at each time during the distillation process varies and as it is practically impossible to regulate the flow of absorbing water to correspond to such variations, the acid received in the different successive carboys will likewise vary in strength. The usual solution of such a problem would, of course, be to run the production covering one or several periods of such recurring variations into a large single blending receiver. This, however, is not possible in the present case, as such a receiver would have to be made of an inert material, such as platinum, gold, quartz, etc.; the cost of such a receiver, even if it could be made, would make the whole process prohibitive.

I have now found a process and devised an apparatus which will allow of the continuous production of substantially chemically pure sulphuric acid of reasonably constant concentration.

One object of my invention is to increase the efficiency of the absorption equipment by allowing the absorption to proceed at comparatively high temperature and to purify the still hot acid in a continuous manner.

My invention comprises distilling relatively pure liquid $SO_3$, as obtained by heating oleum to about 260° C., as described above, and contacting the gaseous pure $SO_3$ produced, with and absorbing it in counter current in pure distilled water in such a manner that the $SO_3$ comes in contact with strong sulphuric acid and the water with dilute acid and blowing the still hot sulphuric acid with heated, purified, and filtered air in a cascade apparatus in which the acid is successively contacted with fresh portions of air. The purified acid is then passed through a cooler and run directly into the shipping containers, viz., glass carboys.

A preferred process is to combine the sulphuric acid as produced according to the above, and which may be of varying concentrations, from several such contacting units into a single flow. By combining the acids I am able to produce an acid which, for all practical purposes, is of sufficiently uniform strength, the variations in the different units compensating each other.

By blowing the acid while still hot, I can easily and economically free it from dissolved $SO_2$. In doing it in successive steps, the individual units will be small and can be constructed from reasonably cheap material. The material will have to be resistant to moderate heat and to the action of strong sulphuric acid. Such units could, of course, be made of platinum or gold, but I found that quartz and pyrex glass, which are both available in all shapes, are just as well suited and have the added advantage of being considerably cheaper.

The blowing of the acid can be effected in various types of apparatus and shape of units, as, for instance, small towers, each tower receiving at the bottom a fresh supply of hot, pure air, the acid running from the bottom of one tower, by gravity, for instance, upon the top of the following tower, or a cascade arrangement being used, the basins could be built of glass or fused silica, the acid running by means of an overflow from one basin into the next lower one, and fresh, pure air bubbled through the acid in each basin. Another convenient form of blowing equipment will be described later on.

The purified acid is then finally passed through a cooler and runs into carboys.

Figure 2:
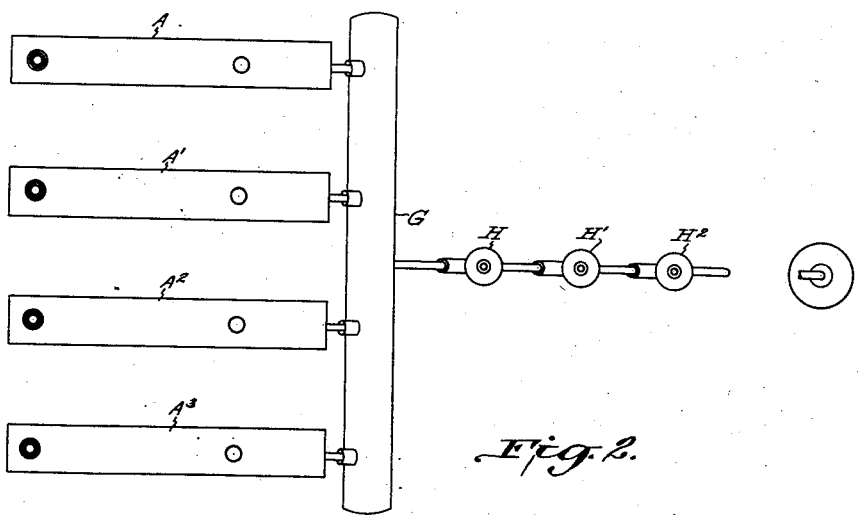

I found a very practical equipment for practicing my invention to consist of the following arrangement, of which Figure 1 is a schematic elevation and Figure 2 a schematic plan view.

"A", in Figure 1, represents the $SO_3$ absorption apparatus; it is made of platinum or gold. It consists of a pipe closed at both ends. Pure distilled water enters at "B"; the water inlet is not tightly fitted into pipe "A" so as to give an access to the atmosphere. Pure gaseous $SO_3$ enters at "C", the inlet pipe extending to near the bottom of pipe "A". "D" is a dam and overflow which maintains a constant liquid level in pipe "A". "E" is a curtain extending below that level and preventing any escape of gas from pipe "A" into the tube "F" which leads the strong acid into a manifold "G", to be described later, and can be omitted if constant strength of the acid produced is not essential.

Pipe "A" is set in a box made of wood or any desired material, not shown in Figure 1, through which cold water is run to absorb the excess heat produced by the absorption of the $SO_3$ in water, and the flow in it is so regulated that the concentrated acid produced leaves through pipe "F" at a temperature at which the succeeding purification by blowing with air is most efficiently effected. The temperature of this acid is usually kept between 50 and 80° C.

For starting the operation, pipe "A" is filled with strong sulphuric acid up to the level of dam "D." Pure $SO_3$ and pure water are introduced simultaneously at the respective points; the sulphur trioxide comes in contact with strong acid which readily absorbs it and the acid overflows at "D." Any $SO_3$ not immediately absorbed at the point of contact "C" travels in pipe "A" in contact with the liquid therein, and is gradually absorbed; the water entering at "B" mixes with the original acid and the diluted acid travels toward "E" at the rate at which the concentrated acid overflows at "D" and gradually increases in strength as it mixes with the strong acid produced in the vicinity of "C" and also absorbs such $SO_3$ as might travel above its surface. It will, therefore, be seen that in normal operation, pipe "A" will contain relatively dilute acid near "B", and acid of increasing strength toward "D"; by regulating the flow of water in proportion to the $SO_3$ introduced, a constant flow of concentrated acid will be obtained at "F." Some very important advantages of this arrangement are that the water comes in contact with dilute acid and the $SO_3$ with strong acid only, preventing, in this manner, any local violent reactions.

"G" is a manifold receiving and mixing the concentrated acid produced in several absorbing units, all of which have an independent supply of pure $SO_3$ gas produced in individual stills distilling liquid $SO_3$ as produced from heating oleum and condensing the evolved $SO_3$. This manifold is conveniently made of platinum or gold and, if desired, can be set in a cooling box. It is advisable, for a smooth running of this equipment, to measure the strength of the acid at any point between "D" and "G", and this can be done in a number of well known ways.

The manifold is arranged to receive the strong acid produced from any desired number of $SO_3$ absorbing units, four being shown in Figure 2. The acid mixes therein, and any variations in the strength of the acid produced in each unit are equalized.

The combined acids run in a single flow at a temperature of, say 50 to 60° C., either by gravity or, if the available spaces and height of buildings require it, by an air lift or other pumping arrangement, into the first unit of the cascade purification system. This consists of a number of like units, three being shown in Figures 1 and 2; their number can be varied, but usually fifteen to twenty-five units are sufficient. These units, represented by "H", "H¹", and "H²", in Figures 1 and 2, are pyrex glass goosenecked flasks. The acid enters through the gooseneck into the bottom of the flasks. It meets then a current of hot, filtered air, and overflows by a side tube into the gooseneck of the next lower flask. The air bubbling through the hot acid entrains the dissolved traces of $SO_2$. The air is introduced through a glass pipe "I" connected with a central air distribution line "K".

The cascade blowing equipment is usually placed under a hood. The spent air, containing traces of $SO_2$ as it escapes from each flask, is collected in the hood and led into a stack.

The acid from the last flask is usually run through a small cooler into the shipping carboys, but as it will have had time to cool somewhat during the blowing process, the cooler might be omitted without serious disadvantage.

Another and quite important advantage of this arrangement is that the whole operation can be carried on continuously, particularly where several absorption units are connected through the manifold. Disconnection of one or even several $SO_3$ distilling stills will not affect the purification step.

I claim:

The process of producing pure, concentrated sulphuric acid which comprises distilling liquid $SO_3$, absorbing the gaseous $SO_3$ in counter current arrangement in pure, distilled water, in such a manner that the $SO_3$ comes mainly in contact with strong sulphuric acid and the water with dilute acid, combining the concentrated acid produced in a plurality of absorbing units into a single flow and freeing the still hot acid from dissolved $SO_2$ by passing it in continuous flow through successive steps in each of which it is blown with fresh portions of air.

In testimony whereof, I affix my signature.

HENRY HOWARD.